W. H. SMITH.
Wad for Projectiles.
No. 1,787. Reissued Oct. 4, 1864.
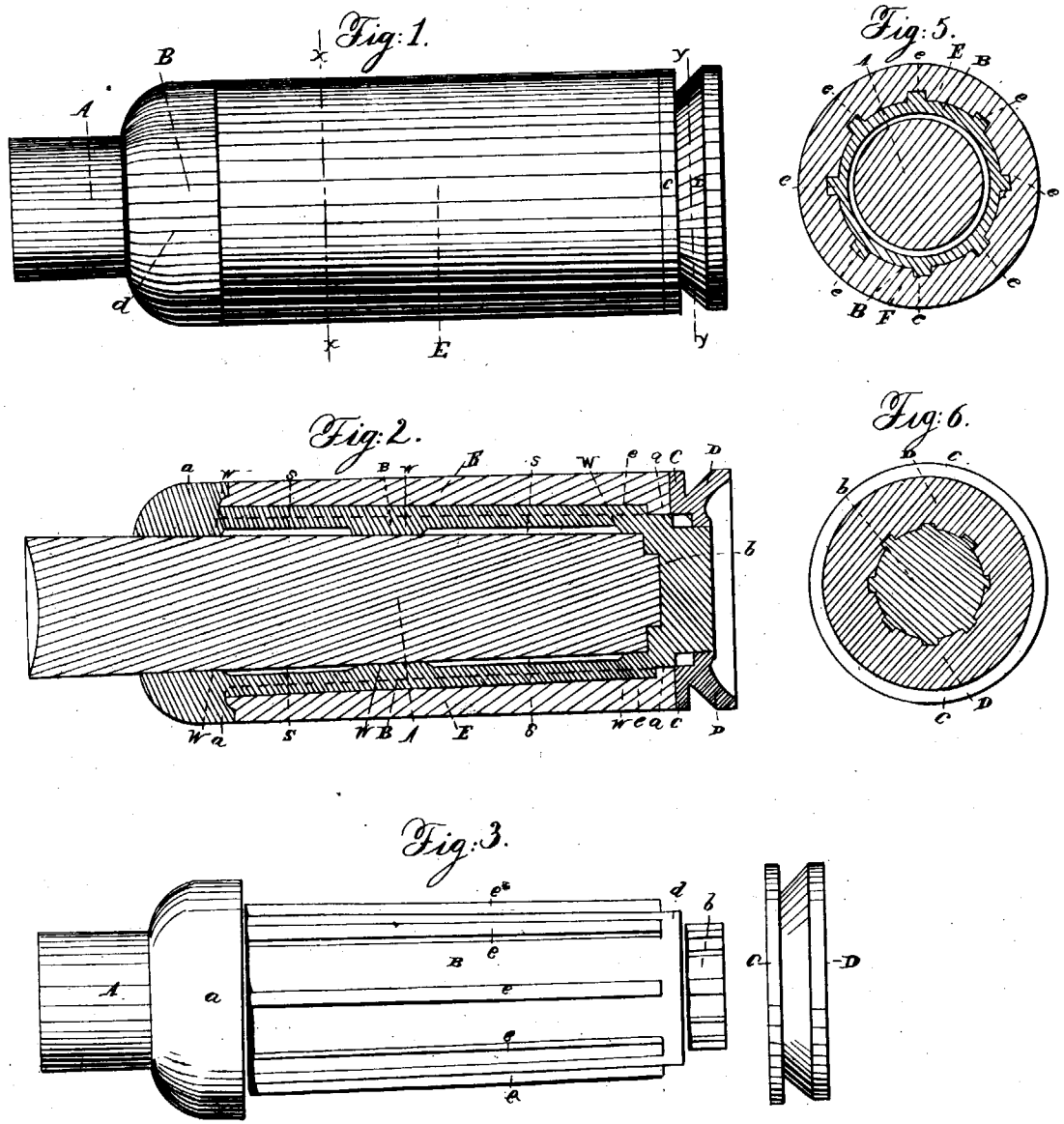
Witnesses.
Samuel Kleyle Jr
John E
Inventor.
Wilson H Smith
By Rothing & Dunn
Attorneys
N. PETERS, PHOTO-LITHOGRAPHER, WASHINGTON, D. C.

UNITED STATES PATENT OFFICE.

W. H. SMITH, OF BIRMINGHAM, CONNECTICUT, ASSIGNOR TO HIMSELF AND ROYAL M. BASSETT, OF SAME PLACE, AND CHAS. D. GIBSON, OF NEW YORK, N. Y.

IMPROVEMENT IN PACKING PROJECTILES FOR RIFLED ORDNANCE.

Specification forming part of Letters Patent No. 41,127, dated January 5, 1864; Reissue No. 1,787, dated October 4, 1864.

*To all whom it may concern:*

Be it known that I, W. H. SMITH, of Birmingham, in the county of New Haven and State of Connecticut, have invented certain new and useful Improvements in Sub-Caliber Projectiles; and I do hereby declare the following to be a full, clear, and exact description thereof, reference being had to the accompanying drawings, and to the letters of reference marked thereon.

My invention relates to that kind of projectiles known as "sub-caliber"—that is, a projectile formed of a heavy central bolt or portion surrounded by a light casing or jacket large enough to fit the bore of the gun. Previous to my present invention the jacket or casing has been made about as large in diameter as the bore of the gun, and long and thorough experiment with projectiles having their centering (or surrounding) jackets thus made has demonstrated several (radical) practical objections to them. In the first place the greatest desideratum to be accomplished in the construction of a sub-caliber projectile is to throw the greatest possible proportion of the whole weight into the central bolt or portion, (leaving the centralizing jacket as light as possible,) since the grand object of making a projectile sub-caliber is to effect the concentration of the explosive force due to a given size bore onto a penetrating-surface of less diameter and have the jacket or case to serve only the purpose of a medium for impacting such force (due to a large bore) to a small bolt; but to serve the purpose of such a medium the jacket must be strong enough to withstand the immense strain and pressure to which it is subjected when the explosion of the charge of a gun takes place and to effect the proper rotation of the (heavy) central bolt on its imaginary axis. With the jacket made as heretofore these ends cannot be accomplished, for if the jacket be made of any material lighter than metal it will be bursted or torn to pieces by the pressure of the surrounding gases, (which is about eighty-seven thousand pounds to the square inch with No. 7 powder;) and if made of metal in the forms heretofore known it cannot be made strong enough without its weight being so great as to destroy the relative proportions of weight between the bolt (or penetrating portion of projectile) and the casing or jacket, (which is employed only to impart motion to the bolt.) The standard laid down for producing a successful sub-caliber shot by the officers of the United States is this, viz: that the central bolt shall weigh forty pounds and the rest of the projectile twenty-five pounds, making a total weight of sixty-five pounds for a one-hundred-pound gun—that is, a one-hundred-pound gun reduced to sixty-five pounds.

My invention has for its main object to reduce the weight of the centralizing or bolt-sustaining medium without diminishing its full capacity of strength and effectiveness.

To this and other minor ends my invention consists, first, in making the internal diameter of the centralizing jacket of a sub-caliber projectile to correspond with the external diameter of its body or bolt, and combining with the rear end of the jacket or case a ring or band (corresponding in diameter to that of the enlarged forward end of jacket and acting in conjunction with said jacket to center and retain the body or bolt in the bore of the gun,) whereby I am enabled to reduce, in proportion to the reduction of the diameter of the greater portion of the jacket, the weight thereof, and at the same time have the jacket equally strong with the same or less thickness of stock, all as hereinafter more fully described.

My invention consists, secondly, in the employment, in combination with the centralizing jacket or its equivalent, of an annular band of packing surrounding that portion of the jacket which lies between the enlarged head and the rear band or ring, about equal in extreme diameter to the common diameter of said rear band and enlarged front portion, and composed of any suitably light and sufficiently tenacious material or composition, as hereinafter more fully set forth.

My invention consists, thirdly, in making the centralizing ring or band arranged on the rear end of the jacket in such a manner, and so combining it with said jacket and the surrounding packing or case of light material that the said ring will be caused to slide forward on the jacket by the force of the discharge and upset the said packing, whereby a more perfect prevention of the escape of gases and a more complete filling of the grooves of the gun and rotation of the projectile are effected.

To enable those skilled in the art to make and use my invention, I will proceed to describe the construction and operation of one of my improved sub-caliber projectiles, referring by letters to the accompanying drawings, forming part of this application, and in which—

Figure 1 is a longitudinal elevation of one of my improved projectiles. Fig. 2 is a longitudinal central section of the same. Fig. 3 is a longitudinal elevation of the bolt and jacket with the outer case or packing and the rear band and sabot removed. Fig. 4 is an elevation of the sabot and rear ring. Fig. 5 is a cross-section at line *x x*, Fig. 1; and Fig. 6 is a cross-section at line *y y*, Fig. 1.

In the several figures the same part is indicated by the same letter of reference.

A is the body or bolt, which is made as usual of steel or hardened iron in a nearly cylindrical form, being a little larger at its forward end and tapered regularly, (or it may be made of iron tipped at front end with steel,) and having its forward end slightly dished out to form a sort of cutting-edge, as clearly seen at Fig. 2.

B is the centralizing jacket, which is made of metal in about the form seen, having its forward portion enlarged, as shown at *a*, to fill the bore of a gun to which the projectile is adapted, and its rear end closed, as shown at Fig. 2. This jacket B is formed with numerous longitudinal ribs, *c c c*, on its exterior, and with a square or rectangular depression or mortise in the internal surface of its rear end or head adapted to receive a correspondingly-shaped projection on the rear end of the body or bolt A. The jacket B is just large enough and so shaped inside as to fit snugly over the body A, extending from and over the rear end up to near the forward end of bolt A.

To save the labor of turning the whole of the interior surface of B, it may be cast with annular depressions S S, and only turned, as seen at W W W, so as to afford ample bearing-surfaces for the bolt A.

C is a ring or washer, of any suitable metal, which is equal in diameter to the forward ring portion, *a*, of the jacket, and which is secured to a sabot or expansible dish-like piece, D, of soft metal. The ring C, or washer, fits over, and is capable of sliding (as will be presently explained) on, the smooth cylindrical surface *d* (see Fig. 2) of the jacket B, while the sabot D is fitted onto the tail piece or portion *b* of jacket B (which portion *b* is ribbed longitudinally) in such manner that while it can slide longitudinally on said portion *b* it cannot turn around thereon.

E is an annular band or filling between the ring C and ring portion *a*, and surrounding the body part of the jacket. This filling or packing case E, I propose to make of paper, papier-maché, gutta-perch, rubber compound, or any other suitable soft and tenacious material or composition, which may be cast or molded on or pressed on in rings or annular sections. The perimeter of the filling-in or packing E should correspond with those of the portions *a* and C, and said packing forced or molded onto the ribbed surface of the body of jacket B will, it will be seen, be prevented thus from turning on said body of B.

The several parts being constructed and arranged together, as shown and described, will operate in the following manner: When the discharge or explosion of the charge which is to project the shot takes place, the explosive gases first drive forward the sabot D and washer C (the former sliding on its ribbed mandrel *b* and the latter on the portion *d* of the jacket) a short distance, the sabot D being at the same time expanded circumferentially by the action of the explosive gases on its dished base, (in a manner well known.) The sabot D is checked by the shoulder formed between the larger and smaller portions *d* and *b* of jacket B, but is carried far enough forward on said jacket to force the washer C sufficiently forward to upset the stock of the packing E, and cause it to fill tightly the bore of the gun and its grooves, if rifled, as does also the sabot D. By this method of construction, it will be seen, not only the sabot D is expanded to fill the bore and grooves, cut off windage, and rotate the jacket B, (which carries with it the body or bolt A,) but the packing E is also made to fill the bore and grooves, and, by means of its connection (by the ribs *c*) with jacket B, assist the rotation of said jacket. If the material or stock of band E be sufficiently strong, it will continue on jacket B during the flight of the projectile through the air, presenting a plain or smooth surface to the action of the atmosphere. When the projectile strikes, the jacket B and its rear ring and sabot C and D will all be stripped off during the penetration of the bolt A, provided the object being penetrated is of a sufficiently dense and hard nature—as, for instance, the armor of a heavily iron-clad ship or fort.

It will be understood that by making the jacket B of a diameter (during the greater portion of its length) sufficient only to fit closely over the bolt A, in lieu of making it to about fill the bore of the gun, as heretofore, I am enabled to reduce very greatly the weight of the centralizing apparatus and proportionally increase the weight of the bolt without decreasing the strength of said jacket, thereby gaining a great desideratum and producing a sub-caliber projectile, which will effect greater penetration, and can be more successfully fired than any heretofore known.

Having explained the construction and operation of my improved sub-caliber projectile, what I claim therein as new, and desire to secure by Letters Patent, is—

1. Making the jacket or centering-case of a sufficient diameter only (during the greater portion of its length) to fit over the bolt or body A of the projectile, and with an enlargement near its forward end, in combination with a suitable band or washer near its rear, the whole constructed to operate substantially as and for the purpose set forth.

2. The employment, in combination with the jacket or centering-case having an enlargement near its front end and a band, washer, or the equivalent thereof near its rear end, of a surrounding band or belt of packing material, E, substantially as set forth.

3. I am aware that sliding washers on base-pieces have been employed (on projectiles) which were forced forward by the force of the discharge, and which operated to wedge outward or expand during their sliding motion a packing band or ring. I do not, therefore, claim a sliding washer on the rear end of a projectile; but I do claim the combination of the sliding band or washer C with the casing E and sabot D, the whole arranged to operate substantially as described, for the purpose set forth.

In testimony whereof I have hereunto set my hand and seal this 7th day of June, 1864.

W. H. SMITH. [L. S.]

In presence of—
J. C. McINTIRE,
ANDREW I. TODD.